(12) United States Patent
Kumar et al.

(10) Patent No.: US 12,045,043 B2
(45) Date of Patent: Jul. 23, 2024

(54) MACHINE LEARNING BASED RESOURCE ALLOCATION IN A MANUFACTURING PLANT

(71) Applicant: SAP SE, Walldorf (DE)

(72) Inventors: Anuj Kumar, Bengaluru (IN); Sathish Karhtik Ramu, Bengaluru (IN)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 16/213,398

(22) Filed: Dec. 7, 2018

(65) Prior Publication Data
US 2020/0183369 A1    Jun. 11, 2020

(51) Int. Cl.
*G05B 19/418*    (2006.01)
*G05B 13/02*    (2006.01)

(52) U.S. Cl.
CPC ... *G05B 19/41865* (2013.01); *G05B 13/0265* (2013.01); *G05B 2219/32306* (2013.01); *G05B 2219/32365* (2013.01)

(58) Field of Classification Search
CPC ........ G05B 19/41865; G05B 19/32306; G05B 19/32365; G05B 13/0265
See application file for complete search history.

(56) References Cited

U.S. PATENT DOCUMENTS

| | | | |
|---|---|---|---|
| 6,400,999 B1 | 6/2002 | Kashiyama et al. | |
| 6,704,719 B1 * | 3/2004 | Ericson | G06K 9/6282 706/48 |
| 9,292,350 B1 * | 3/2016 | Pendharkar | G06F 9/5044 |
| 2003/0088847 A1 * | 5/2003 | Chang | G03F 7/70425 700/121 |
| 2006/0004682 A1 * | 1/2006 | Danielson | G06N 7/005 706/52 |
| 2017/0213280 A1 | 7/2017 | Kaznady | |
| 2017/0228198 A1 * | 8/2017 | Koormamtharayil | G06F 3/126 |
| 2017/0320182 A1 * | 11/2017 | Jeong | B23Q 17/098 |
| 2018/0217991 A1 * | 8/2018 | Dato | G06F 16/9535 |
| 2019/0049929 A1 * | 2/2019 | Good | B33Y 50/02 |

FOREIGN PATENT DOCUMENTS

| | | |
|---|---|---|
| DE | 10044516 A1 | 12/1999 |
| JP | 2008181453 A | 7/2008 |
| JP | 2017021657 A * | 1/2017 |
| WO | 2018083512 A1 | 5/2018 |

OTHER PUBLICATIONS

Machine Translation for JP2017021657, obtained Jan. 2020.*
(Continued)

*Primary Examiner* — Robert E Fennema
*Assistant Examiner* — Vi N Tran
(74) *Attorney, Agent, or Firm* — Fountainhead Law Group P.C.

(57) ABSTRACT

A work center in a manufacturing setup includes a machine learning model that uses a decision tree to facilitate the work of a supervisor on the production line to choose a machine to perform a particular operation on a particular part. The decision tree outputs a ranking of machines indicating the suitability of the ranked machines for performing the particular operation on the particular part.

20 Claims, 9 Drawing Sheets

(56) References Cited

OTHER PUBLICATIONS

L. Horvfith and I. J. Rudas, "A machine learning based approach to manufacturing process planning", Proceedings, 1993 IEEE International Symposium on Industrial Electronics, pp. 429-433, 1993. (Year: 1993).*

Duda J., Pobożniak J. (1995) Expert System for Process Planning. In: Kochhar A.K. (eds) Proceedings of the Thirty-First International Matador Conference. Palgrave, London. pp. 527-533. (Year: 1995).*

Extended European Search Report, European Application No. 19211742.2, dated Mar. 11, 2020, 8 pages.

European Patent Office, Examination Report for Application No. 19211742.2, dated May 21, 2021, 12 pgs.

* cited by examiner

MACHINE LEARNING BASED RESOURCE ALLOCATION IN A MANUFACTURING PLANT

BACKGROUND

Directing an operation to a resource in a manufacturing setup is always a challenging problem. Usually it is done based on experience or heuristic. Such methods result in inefficient use of resources, defects and breakdowns. Combinatorial optimization-based job shop scheduling provides an alternate approach to solve the problem, but it becomes highly complicated when there are a lot of variables to consider, and can only provide a sub-optimal result in many cases.

In a manufacturing setup, there are generally a large number of work centers each consisting of multiple resources (e.g., machines) and a diverse range of operations performed by those resources. Allocating resources for given operation becomes a complex problem. Sub-optimal allocation often results in a loss of productivity and increases the cost of production. Under a scenario where there are several operations to be performed and various operations run on distinct work centers, where each work center has a set of resources to choose from, performing an operation using the right resource becomes a challenge and often result into bottleneck. The lack of a proper mechanism or a guiding principle to choose a suitable combination of operation and resource often results in machine breakdown or biased use of resources such that some resources are used extensively while others may not be used at all or only rarely used. This is a common problem across both discrete and process industries.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
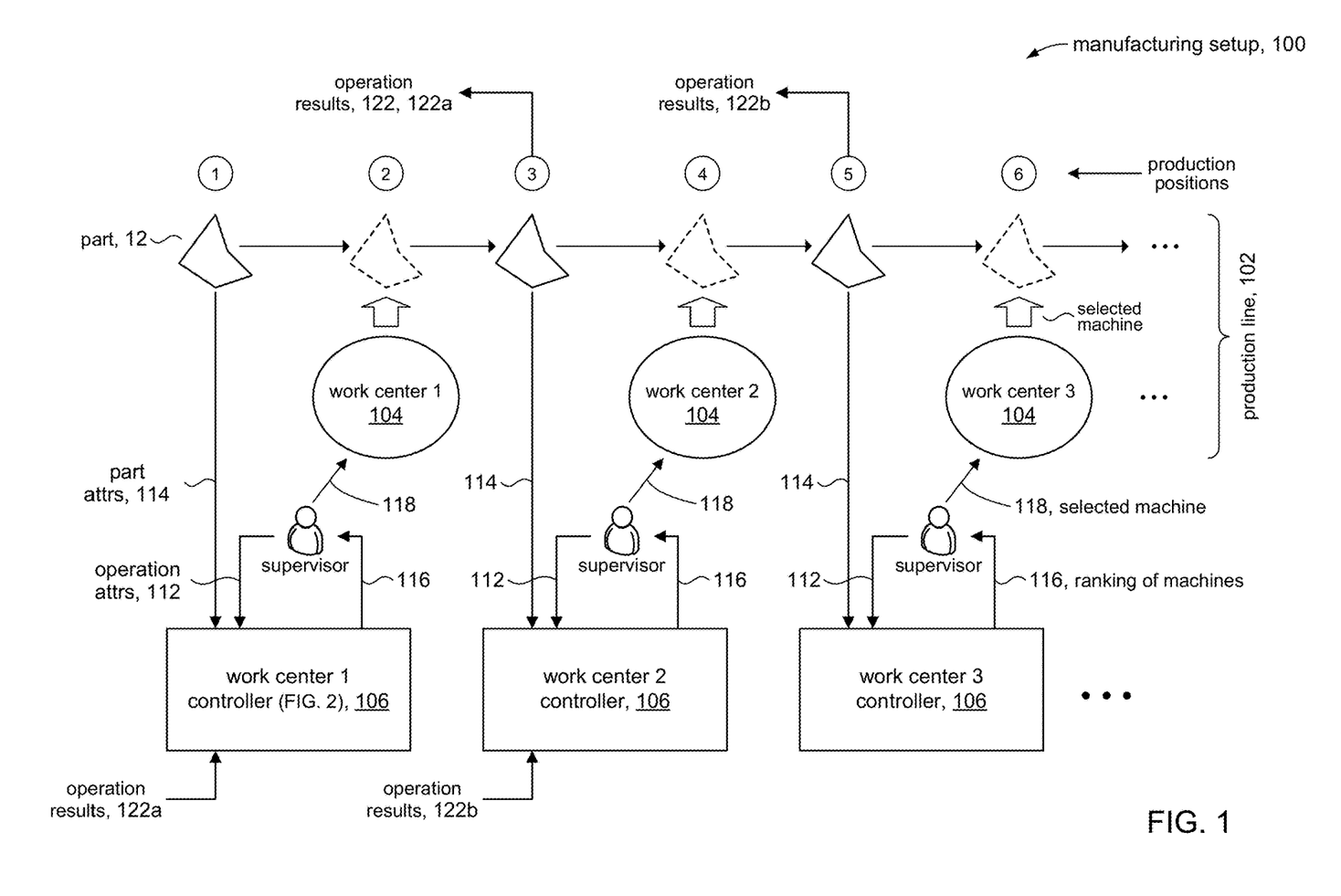
FIG. 1 shows a manufacturing setup in accordance with the present disclosure.

FIG. 1 shows a manufacturing setup 100 in accordance with embodiments of the present disclosure. The manufacturing setup 100 can include a production line 102 comprising various work centers (workshops) 104 for producing an item (not shown). The item can be a finished product (e.g., washing machine), a component (e.g., engine block) for subsequent assembly into a finished product, and the like. The item can be any item of manufacture, and can be mechanical (e.g., office stapler), electrical (e.g., computer monitor), or electromechanical (e.g., food blender) in nature, and so on. The examples given are merely illustrative, as one of skill in the art will appreciate.

The production line 102 can be configured so that a part 12 can be moved sequentially along the line and stop at work centers 104 along the line where one (or more) operations can be performed on the part 12. The part 12 can move along some kind of conveyor, or be moved manually by staff or forklift, and so on. Operations performed at each of the work centers 104 can include machining (cutting, drilling, welding, sanding, etc.), painting, drying, assembly, testing, and so on.

Each work center 104 can comprise several resources/machines (machines) to perform one (or more) operations on a part 12 that is delivered to the work center 104. The work center 104 can include a wide range of machinery, tools, and other equipment to perform the operation, and can configured for various levels of automation using computers, robots, and other equipment. It can be appreciated that allocating the correct combination of such resources/machines to perform an operation in a given work center 104 (e.g., work center 1) can therefore be a complex problem.

Each work center 104 can be associated with a supervisor/operator who manages the work center 104. In some embodiments, one supervisor may manage several work centers 104, and in other embodiments each work center 104 may be managed by its own supervisor such as depicted in FIG. 1.

In accordance with the present disclosure, operations at a work center 104 can be controlled, monitored, and otherwise managed by a corresponding work center controller 106. The supervisor at a work center 104 (e.g., work center 1) can provide the corresponding work center controller 106 (e.g., work center 1 controller) with operation attribute information 112 of an operation to be performed by the work center 104. The operation attributes 112 can include parameters of the operation, such as for example, an identifier of the operation, a name of the operation, operation type, start time of the operation, finish time of the operation, duration of the operation, and so on. The operation attributes 112 can include characteristics of the operation, such as for example, priority, plan setup time, plan processing time, dispatched flag, fix-indicator, quantity to build, quantity completed, and so on. Attributes 112 for every operations can be stored and called up (e.g., by a supervisor) when an operation is going to be performed.

The work center controller 106 can also receive part attribute information 114 of the part 12 to be operated on. Part attributes 114 can describe physical properties of the part 12, such as for example, weight, temperature, dimensions, type of material, and so on. Part attributes 114 can also include parameters, such as for example, name of the part, when the part was made, source of the part (e.g., vendor who supplied the raw material), and so on. These attributes 114 can be stored for every part 12, and called up (e.g., by a supervisor) when a part is going to be processed.

In accordance with the present disclosure, the work center controller 106 can generate a ranked set of resources/machines (hereinafter "machines") 116 in the particular work center 104 that can perform the particular operation on the particular part 12. In accordance with the present disclosure, the work center controller 106 can use machine learning to develop the rankings 116. In some embodiments, the rankings 116 can be expressed as probabilities. In some instances, the rankings 116 may comprise only a subset of all available machines in the work center 104. These aspects of the present disclosure are discussed in more detail below.

The supervisor can review the rankings 116 provided by the work center controller 106 to select machine 118 in the work center 104 to perform the operation on part 12. In some embodiments, the supervisor can select the highest ranked machine in the rankings 116. In other embodiments, the supervisor can select another machine (e.g., second highest ranked machine) from the rankings 116. For example, if the highest ranked machine is down, the supervisor can use the rankings 116 to determine the next most suitable machine to select. In some embodiments, the supervisor may determine that the machines identified in the rankings 116 may not be suitable, and select a machine in the work center 104 that did not make the rankings.

In accordance with the present disclosure, operation results 122 can be generated after completion of an operation on the part 12 by a work center 104. FIG. 1, for example, shows the progression of part 12 to positions (1-6) along the production line 102 as it is operated on by the work centers 104. For example, the part 12 enters the production line 102 a position 1, and is operated on in work center 1 at position 2. Position 3 represents the state of part 12 after being operated on by work center 1, and likewise at positions 4, 5, and 6.

The operation results 122 can comprise any data relating to the part 12 after being operated on and/or the operation performed on the part 12. The operation information 122 can be used to assess the performance of the machine selected to perform the operation. For example, the part 12 at position 3 can be inspected to collect data relating to an operation performed on the part 12 at work center 1, such as machining tolerances, paint uniformity, amount of material wastage, etc. Data can be collected about the operation itself; for example, time for the selected machine to perform the operation, amount of resources consumed by the selected machine, and so on.

The operation results 122 can serve as feedback to improve the rankings 116 generated by the work center controller 106. For example, operation results 122a at position 3 can be provided to the work center 1 controller, and likewise, operation results 122b at position 5 can be provided to the work cent 2 controller. This aspect of the present disclosure is discussed further below.

Figure 2:
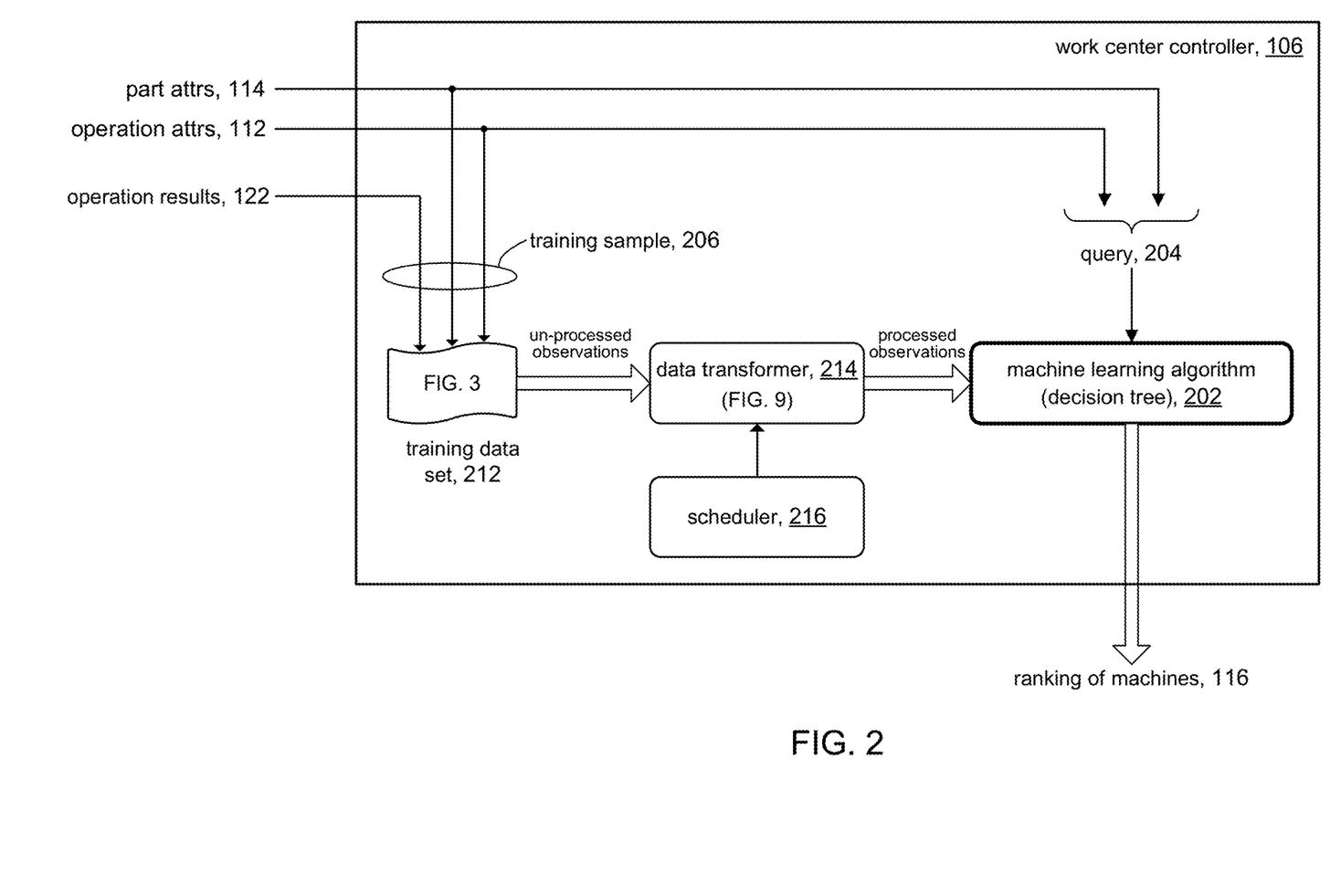
FIG. 2 shows details of a work center controller in accordance with the present disclosure.

FIG. 2 illustrates a component in a work center controller 106 in accordance with the present disclosure. Each work center controller 106 can include machine learning to facilitate the work of the supervisor in selecting a suitable machine in a work center 104 for a particular operation on a particular part 12. In some embodiments, the machine learning can use a tree-based learning algorithm (referred to as decision trees) to implement a predictive model in a manufacturing setting. A decision tree is a type of machine learning algorithm used in classification problems to classify an observation into one of several (two or more) classes. More particularly, a decision tree uses the attributes in the observation to map the observation to a leaf that identifies, maps, or otherwise corresponds to one of the several classes.

A decision tree 202 in accordance with the present disclosure, however, does not identify a single class from among several possible classes for a given observation. Instead, a decision tree 202 in accordance with the present disclosure can produce a ranking of the several classes for a given observation. In the context of the present disclosure, the observation may be more appropriately referred to as a query, because the output of the decision tree 202 provides information that allows a supervisor to select a machine to perform an operation on a part. Therefore, in accordance with the present disclosure, the part attributes 114 of a particular part 12 and the operation attributes 112 of a particular operation to be performed on the part 12 can collectively constitute a query 204 that is provided to the decision tree 202, as shown in FIG. 2. The "classes" correspond to the machines in a given work center 104.

Thus, instead of identifying a single machine (class) in the work center 104 to perform the particular operation on the particular part 12 (query), the decision tree 202 of the present disclosure can output a ranking 116 of several of the machines (classes) in the work center 104 based on the query 204, where the highest ranked machine(s) indicate they may be most suitable for the particular operation/part, with progressively lower ranked machines deemed to be progressively less suitable for the particular operation/part. In a particular implementation, the decision tree 202 is based on the C5.0 decision tree; although it will be appreciated that in other implementations the decision tree 202 can be based on other types of decision trees, such as ID3, C4.5, CART, and the like. In some embodiments, the ranking 116 can include all the machines in the work center 104, and in other embodiments the ranking 116 can include only a subset of the machines in the work center 104.

A training data set 212 can be used to train the decision tree 202. In some embodiments, for example, the training data set 212 can be accumulated by recording training samples 206 comprising attributes 112 of operations, attributes 114 of respective parts operated on by those operations, and respective machines that performed the operations. The training data set 212 can also include operation results data 122.

Figure 3:
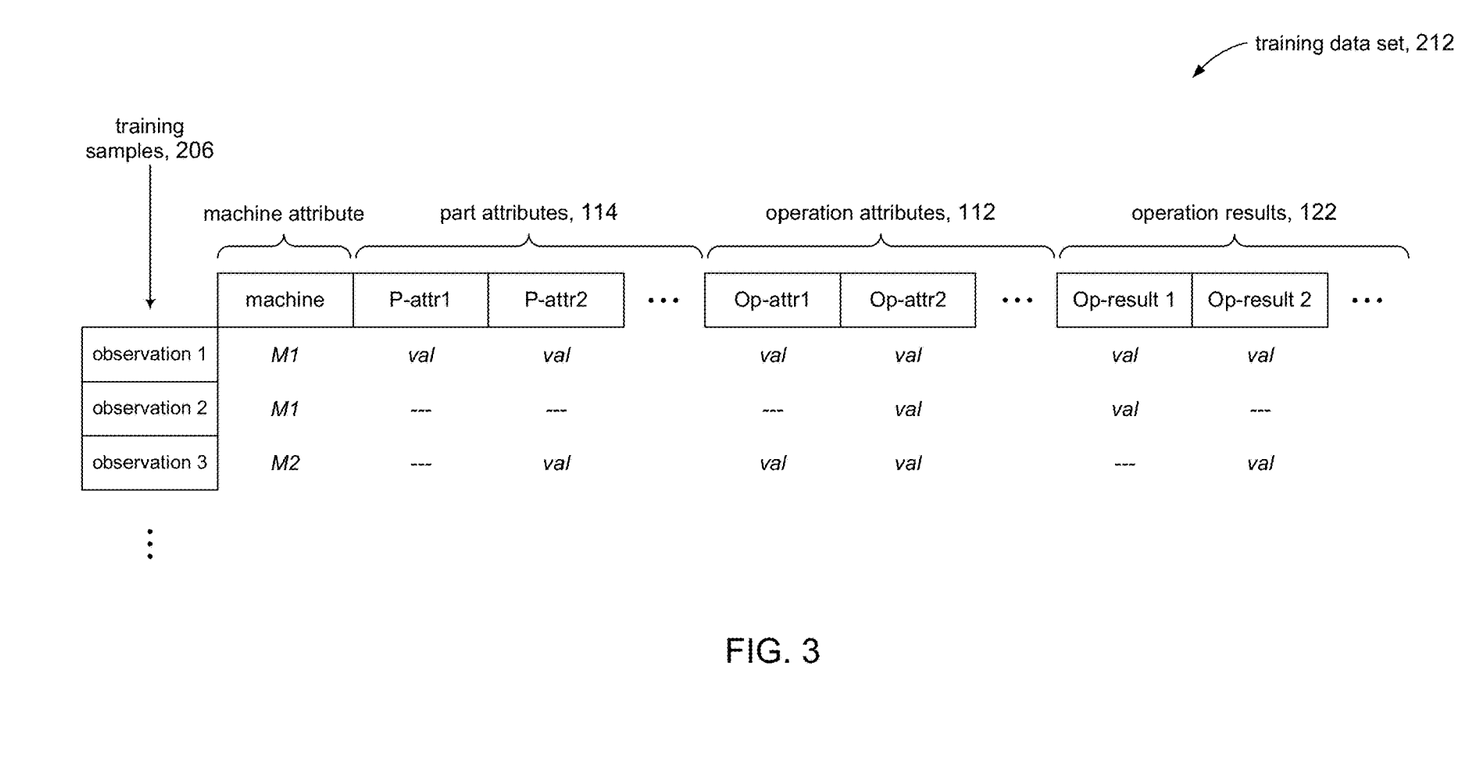
FIG. 3 shows details of a training data set in accordance with some embodiments of the present disclosure.

Referring for a moment to FIG. 3, the training set data 212 can be organized by training samples 206. Each training sample 206 includes attributes 114 of a part to be processed, attributes 112 of an operation to be performed on that part, and the machine (e.g., machine identifier) that was used to perform the operation. Operation results 122 obtained after the part has been operated on can also serve as additional attributes in the training sample 206. Since the decision tree 202 is designed to produce a ranking 116 of machines for a given query 204, in accordance with the present disclosure, the machine attribute can be referred to as the target (or class) attribute.

Although not depicted in FIG. 3, implicit attributes can be derived from combinations of the explicit attributes (part attributes 114, operation attributes 112, and operation results 122). For example, an operation attribute of QUANTITY-PRODUCED and an operation attribute of ELAPSED-TIME may be explicit attributes, which can be combined (e.g., QUANTITY-PRODUCED÷ELAPSED-TIME) to yield an implicit (implied) attribute called PRODUCTION-RATE. The training data set 212 can also implicit attributes.

The illustrative example of a training data set shown in FIG. 3 shows that for some training samples certain attributes may not be relevant, and so data those attributes may not exist. For example, suppose that HOLE-DIAMETER is an operation attribute. When the operation is a welding operation, the HOLE-DIAMETER attribute is not relevant. In a training sample 206 where the operation is a welding operation the HOLE-DIAMETER attribute may be blank or otherwise nulled out.

Continuing with FIG. 2, the training data set 212 can be used to perform the initial training of the decision tree 202, using the machine attribute as the target class; in other words, the training data set 212 is used to train decision tree 202 to identify a machine based on the other data fields in the training data set 212. For the initial training, the training data set 212 comprises training samples 206 about machines, parts, and operations at given work center 104 made prior to the decision tree 202. The training data set 212 can be used to retrain the decision tree 202, in which case, the training data set 212 can include additional training samples 206 collected since the last retraining (or initial training) session.

A data transformer 214 can receive raw un-processed training samples from the training data set 212 and convert the data into processed training samples that are in a format that can facilitate training (or retraining) of the decision tree 202. This aspect of the present disclosure is discussed below.

A scheduler 216 can trigger retraining sessions. In some embodiments, for example, the scheduler 216 can trigger retraining in a periodic manner (e.g., weekly, monthly, etc.). The scheduler 216 can trigger retraining after some number of training samples 206 have been collected since the last retraining session. The scheduler 216 can trigger retraining in response to a command from an administrator. The scheduler 216 can trigger retraining in response to an event (e.g., installation of new machine, removal of old machine, etc.), and so on.

Figure 4:
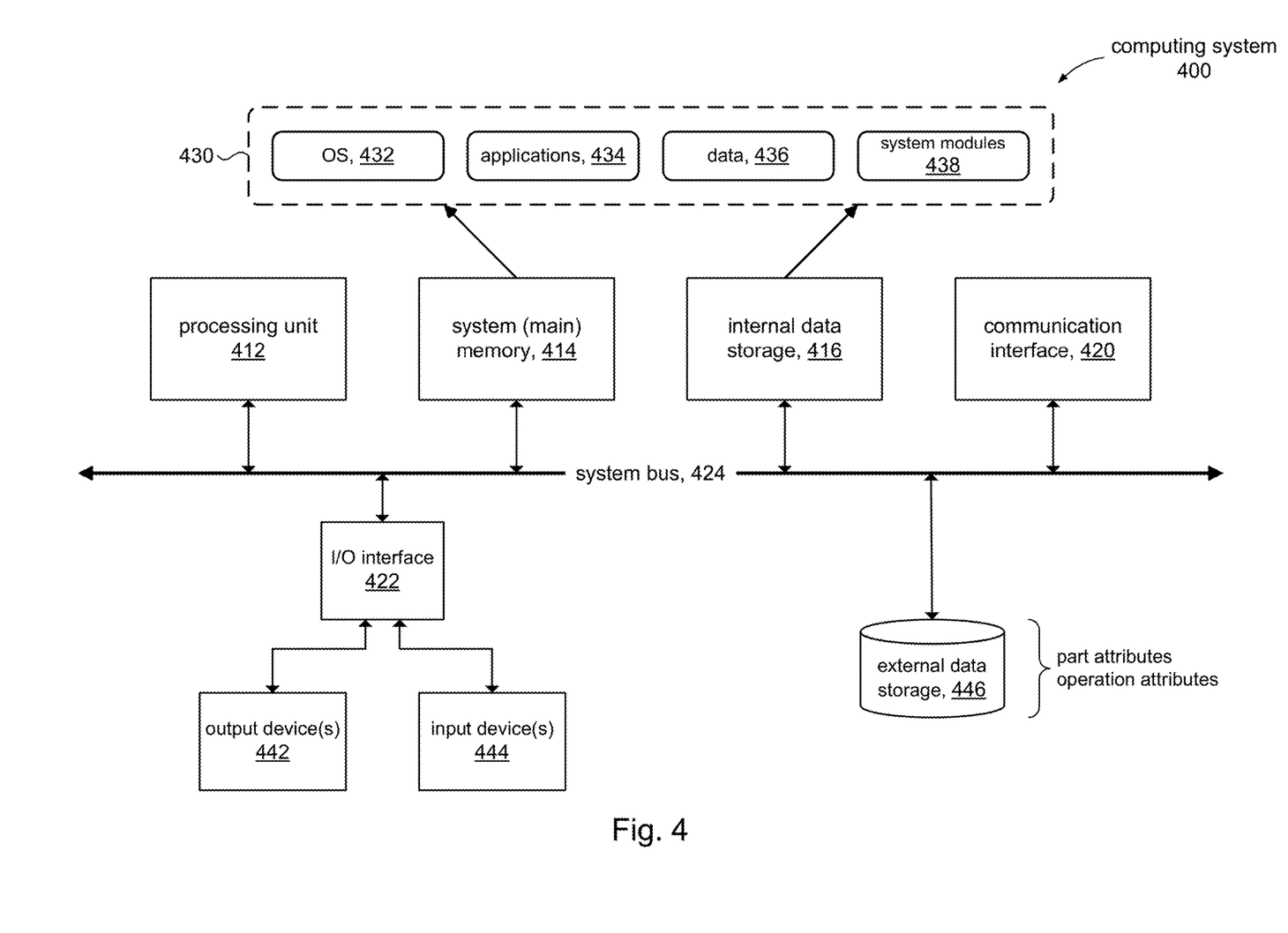
FIG. 4 shows details of a computer system in accordance with some embodiments of the present disclosure.

FIG. 4 is a simplified block diagram of an illustrative computing system 400 for implementing one or more of the embodiments described herein (e.g., work center controller 106, FIG. 1). The computing system 400 can perform and/or be a means for performing, either alone or in combination with other elements, operations in accordance with the present disclosure. Computing system 400 can also perform and/or be a means for performing any other steps, methods, or processes described herein.

Computing system 400 can include any single- or multi-processor computing device or system capable of executing computer-readable instructions. Examples of computing system 400 include, for example, workstations, laptops, servers, distributed computing systems, and the like. In a basic configuration, computing system 400 can include at least one processing unit 412 and a system (main) memory 414.

Processing unit 412 can comprise any type or form of processing unit capable of processing data or interpreting and executing instructions. The processing unit 412 can be a single processor configuration in some embodiments, and in other embodiments can be a multi-processor architecture comprising one or more computer processors. In some embodiments, processing unit 412 can receive instructions from program and data modules 430. These instructions can cause processing unit 412 to perform operations in accordance with the various disclosed embodiments (e.g., FIGS. 7-9) in accordance with the present disclosure.

System memory 414 (sometimes referred to as main memory) can be any type or form of storage device or storage medium capable of storing data and/or other computer-readable instructions, and comprises volatile memory and/or non-volatile memory. Examples of system memory 414 include any suitable byte-addressable memory, for example, random access memory (RAM), read only memory (ROM), flash memory, or any other similar memory architecture. Although not required, in some embodiments computing system 400 can include both a volatile memory unit (e.g., system memory 414) and a non-volatile storage device (e.g., data storage 416, 446). The non-volatile storage devices can store parts attributes and operation attributes.

In some embodiments, computing system 400 can include one or more components or elements in addition to processing unit 412 and system memory 414. For example, as illustrated in FIG. 4, computing system 400 can include internal data storage 416, a communication interface 420, and an I/O interface 422 interconnected via a system bus 424. System bus 424 can include any type or form of infrastructure capable of facilitating communication between one or more components comprising computing system 400.

Internal data storage 416 can comprise non-transitory computer-readable storage media to provide nonvolatile storage of data, data structures, computer-executable instructions, and so forth to operate computing system 400 in accordance with the present disclosure. For instance, the internal data storage 416 can store various program and data modules 430, including for example, operating system 432, one or more application programs 434, program data 436, and other program/system modules 438 to implement the decision tree 202 and to support and perform various processing and operations disclosed herein.

Communication interface 420 can include any type or form of communication device or adapter capable of facilitating communication between computing system 400 and one or more additional devices. For example, in some embodiments communication interface 420 can facilitate communication between computing system 400 and a private or public network including additional computing systems. Examples of communication interface 420 include, for example, a wired network interface (such as a network interface card), a wireless network interface (such as a wireless network interface card), a modem, and any other suitable interface.

Computing system 400 can also include at least one output device 442 (e.g., a display) coupled to system bus 424 via I/O interface 422. For example, in FIG. 1, the rankings 116 can be presented to the supervisor on a suitable output device 442. The output device 442 can include any type or form of device capable of visual and/or audio presentation of information received from I/O interface 422.

Computing system 400 can also include at least one input device 444 coupled to system bus 424 via I/O interface 422. In FIG. 1, for example, the supervisor can use a suitable input device 444 to specify a machine 118 to perform the operation. Input device 444 can include any type or form of input device capable of providing input, either computer or human generated, to computing system 400. Examples of input device 444 include, for example, a keyboard, a pointing device, a speech recognition device, or any other input device.

Computing system 400 can also include external data storage subsystem 446 coupled to system bus 424, for example to collect training samples 206 (FIG. 2) in a training data set 212. In some embodiments, the external data storage 446 can be accessed via communication interface 420. External data storage 446 can be a storage subsystem comprising a storage area network (SAN), network attached storage (NAS), virtual SAN (VSAN), and the like. External data storage 446 can comprise any type or form of block storage device or medium capable of storing data and/or other computer-readable instructions. For example, external data storage 446 can be a magnetic disk drive (e.g., a so-called hard drive), a solid state drive, a floppy disk drive, a magnetic tape drive, an optical disk drive, a flash drive, or the like.

Figure 5:
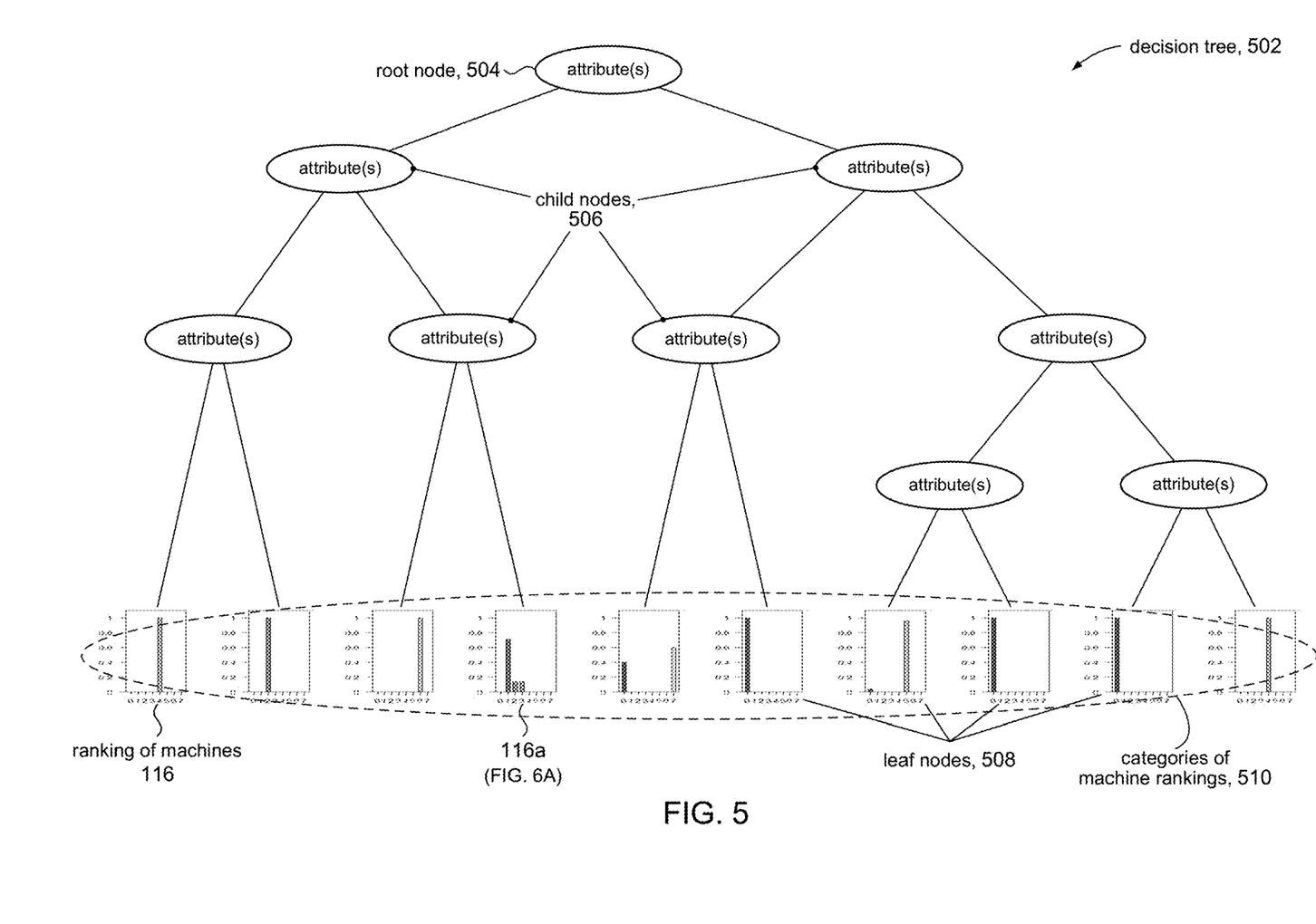
FIG. 5 shows a decision tree in accordance with the present disclosure.

FIG. 5 shows an example of a decision tree 502 in accordance with the present disclosure. The decision tree 502 includes a root node 504 and several child nodes 506 (collectively referred to herein as internal nodes). The decision tree 502 terminates at the leaf nodes 508. Each internal node 504 is associated with at least one attribute in the training data set (e.g., 212). The particular structure of internal nodes of the decision tree 502 depend on the training data set and the training algorithm used to construct the tree. Some training algorithms, for example, may associate each internal node with exactly one attribute from the training data set. Other training algorithms may associate an internal node with one or more attributes from the training data set. In accordance with the present disclosure, the attribute (or attributes) associated with an internal node can include attributes of a part (e.g., type of material—wood, plastic, metal) to be processed in the production line, attributes of the operation (e.g., cutting length) to be performed on the part, and attributes of the results of the operation (operation results 122), either individually or in combination.

Although the figure shows that each internal node splits along two branches (two children nodes), it will be appreciated that in general an internal node can have any number of branches, depending on the training data set and the splitting criteria used by the training algorithm. Using the example above, for instance, suppose a node is associated with an attribute of the part to be processed, the splitting criterion can be based on type of material, in which case the node may have a branch for wood, a branch for plastic, and a branch for metal. This is an example of a categorical split, in which the splitting criterion is based on categories, in this case, wood, plastic, and metal. Splitting criteria can be based on continuous data. Using the example above, for instance, an operation attribute of cutting length can be a splitting criterion. For example, the split may be based on the cutting length being less than 10 inches or greater than or equal to 10 inches. The split may be based on ranges: <10", ≥10" and <15"; ≥15", and so on.

Figures 6A, 6B:
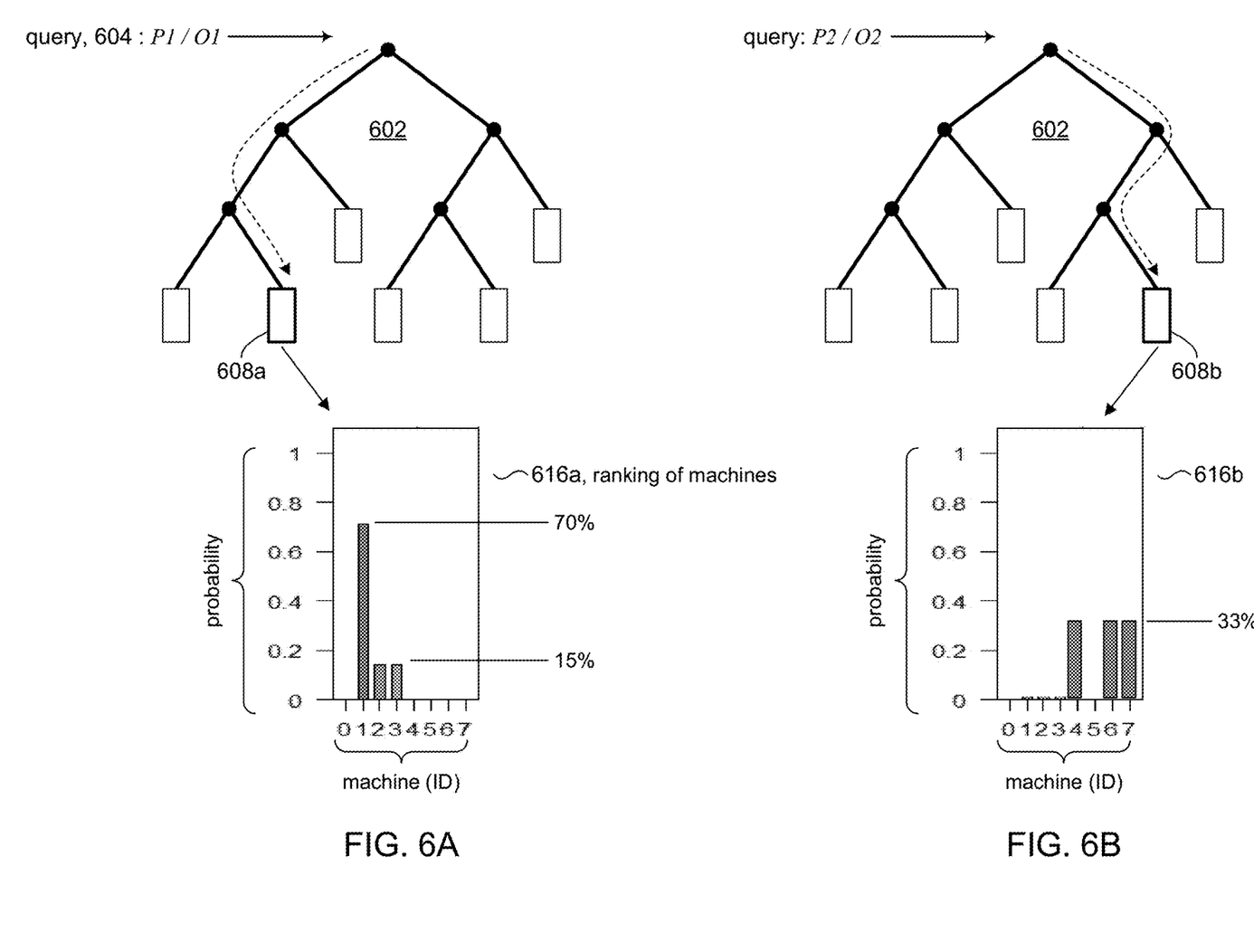
FIGS. 6A and 6B shows details of a ranking of machines in accordance with the present disclosure.

In accordance with the present disclosure, the decision tree splits the training data set into categories of machine rankings 510, instead of individual machines. Accordingly, each leaf node 508 is associated with a ranking 116 of the machines in the work center 104 for a particular operation to be performed on a particular part, rather than associated with a single machine. FIG. 6A illustrates an example.

FIG. 6A shows a decision tree 602 associated with a work center 104. Suppose the work center has seven machines that the supervisor can select from to perform an operation O1 on a part P1. A query 604 can be submitted to the decision tree 602 comprising attributes for part P1 and attributes for operation O1 to be performed on the part. The path of traversal down the decision tree 602 when the decision tree 602 is executed depends on the attribute(s) associated with each node and the attributes in the query 604. Suppose the traversal ends up at leaf node 608A, as shown in the figure. In accordance with the present disclosure, the leaf node 608a can be associated with a ranking 616a of machines in the work center, rather than an identification of a particular machine. Details of the ranking 616a of machines is shown in the FIGURE.

FIG. 6A shows that in some embodiments, the rankings can be expressed as probabilities. The ranking 616a, for example, indicates that machine 1 is associated with a metric of 70%, meaning that for those training samples 206 in training data set 212 which follow the intermediate node criteria of the decision tree 602 corresponding to leaf node 608a, the likelihood of machine 1 being the most suitable machine is 70%. Stated differently, for 70 out of 100 cases, machine 1 would be the correct choice for such training samples/operations. Likewise, the 15% metric indicates that for the same sample that resulted in a 70% metric for machine 1, machine 2 may be the correct choice 15 times out of 100 (15%) and machine 3 may be the correct choice 15 times out of 100 (15%) as well. Yet another way to view this metric is that, based on the training data set 212, machine 1 is recommended because machine 1 works fine 70% of the time. However, in the case that machine 1 is not available, either machine 2 or machine 3 cab be chosen, as both have similar likelihoods of 15%. Since the example shows that the query for operation O1 on part P1 was categorized to this ranking 616a, the metrics can be read as probabilities. Thus, for example, machine 1 has a 70% probability of being a suitable machine, among all the machines in work center, for performing operation O1 on part P1.

FIG. 6B shows an example of another query for an operation O2 on a part P2. Here, execution of the decision tree 602 results in a traversal to leaf node 608b. The associated ranking 616b shows that machines 4, 6, and 7 in the work center indicate they may be equally suitable for performing operation O2 on part P2.

Figure 7:
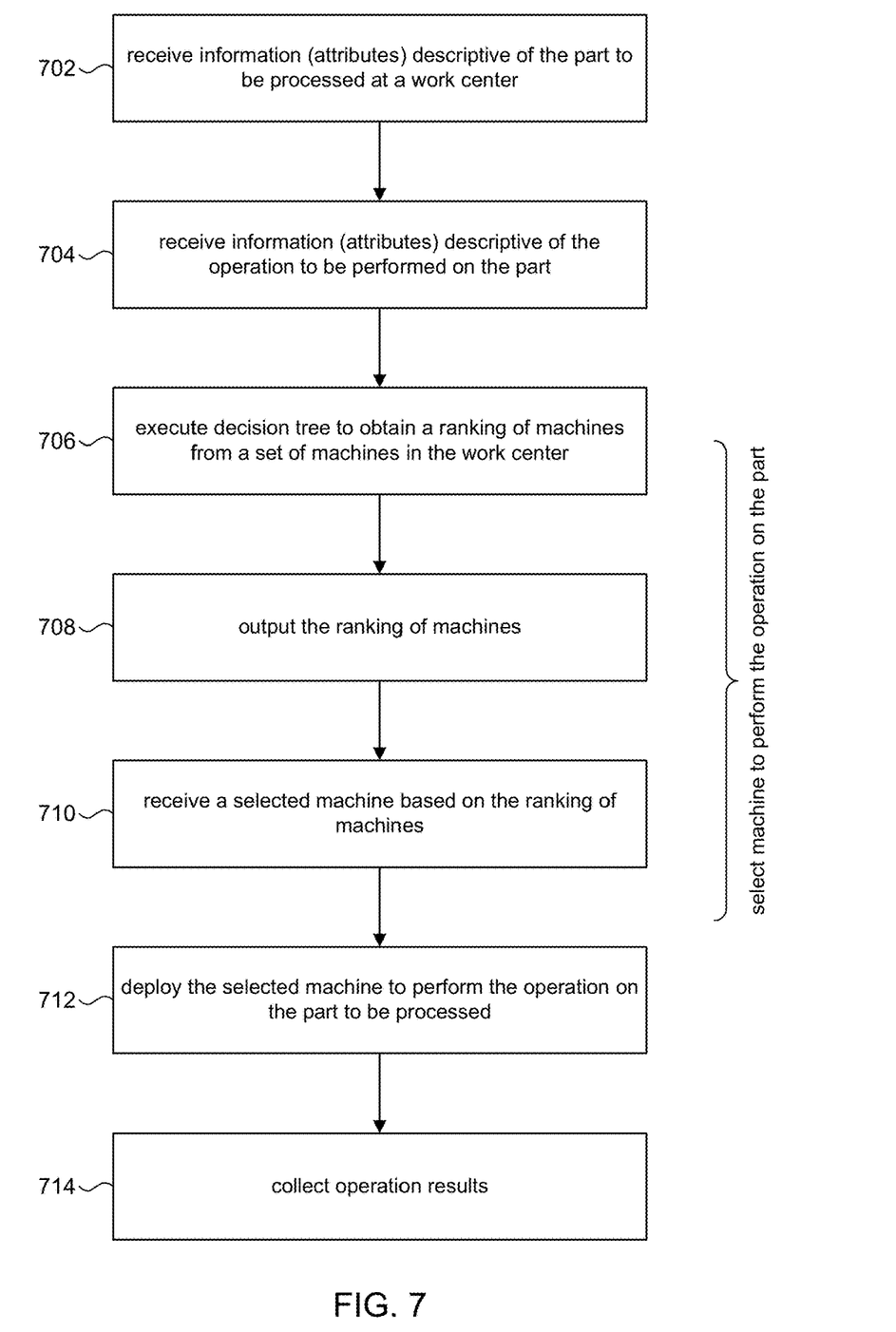
FIG. 7 shows a high level flow for how a supervisor can use a decision tree in accordance with the present disclosure in a manufacturing process.

Referring to FIG. 7 and other figures, the discussion will now turn to a high level description of a decision tree in accordance with the present disclosure can be used in a manufacturing setup. The figure shows operations and processing by the work center controller 106 to produce a ranking 116 of machines in the work center using a decision tree in accordance with the present disclosure to facilitate a supervisor's task during manufacturing. In some embodiments, for example, the work center controller can include computer executable program code, which when executed by a processing unit (e.g., 412, FIG. 4) comprising the work center controller, can cause the work center controller to perform processing in accordance with FIG. 7. The operation and processing blocks described below are not necessarily executed in the order shown, and can be allocated for execution among one ore more concurrently executing processes and/or threads.

At block 702, the work center controller can receive information that describes a part to be processed at a work center (e.g., work center 1, FIG. 1) in the production line 102. In some embodiments, for example, the supervisor can enter a part number or other identifier of the part. In other embodiments, the part may have a tag (e.g., RFID) or other indicia (e.g., bar code) that can be automatically accessed by the work center to identify the part. The work center controller can then access information about the from a database or other data source using the part identifier.

At block 704, the work center controller can receive information that describes the operation to be performed on the specified part. In some embodiments, for example, the information can be stored in a database and accessed by a suitable identifier of the operation.

At block 706, the work center controller can execute the decision tree (e.g., 202, FIG. 2) using information of the specified part and information of the specified operation, which can be collectively referred to as the query. Each piece of information in the query can be treated as an attribute of the part (e.g., name, dimensions, materials, date of manufacture, etc.) or an attribute of the operation (e.g., operation name, operation type, quantity to manufacture, etc.). As explained above, each internal node comprising the decision tree is associated with one of more part attributes and/or operation attributes. Starting with the root node, execution of the decision tree involves selecting a child node as a function of the attribute(s) associated with that node. The function can be a comparison function, where values of attributes associated with that node are compared to values of corresponding attributes in the query; a child node is selected based on the comparison. As a very simple example, consider for instance a node (having children nodes A, B, and C) that is associated with an attribute called WEIGHT. Child node A may be selected if the WEIGHT attribute in the query is less than 10 ounces, child node B may be selected if the WEIGHT attribute in the query is between 10 and 15 ounces, and child node C may be selected if the WEIGHT attribute in the query is greater than 15 ounces.

The process is repeated in the selected child node, and traversal down the decision tree continues in this manner until a leaf node is reached. Each leaf node is associated with a ranking (e.g., 616a, FIG. 6A) of the machines in the work center. As explained below, the rankings are based on the training data set used to train the decision tree, and so each leaf node will have a different set of rankings depending on the training data set.

At block 708, the work center controller can output the obtained ranking of machines in the work center. In some embodiments, for example, the rankings can be displayed on a computer workstation operated by the supervisor. The rankings can be transmitted to the supervisor's mobile device, and so on. In some embodiments, the rankings can be provided to an automation system that can use the ranking information to autonomously select a machine for the specified operation.

At block 710, the work center controller can receive a selected machine to perform the specified operation on the specified part. In some embodiments, the machine can be selected based on the rankings obtained from block 706. For example, the supervisor (or automation system) can select the highest ranked machine. In some instances, however, the highest ranked machine may be unavailable; e.g., the machine may be down for scheduled maintenance or may be unavailable, for example, due to a crash or other mishap. By providing a ranking of machines that can perform the specified operation on the specified part, the supervisor in such a situation, can readily and quickly determine the next most suitable machine to perform the work without impacting the progress of the production line. By comparison, if the decision tree specified only one machine, then the supervisor would have no information to identify an alternative machine in a timely manner, which can result in a slow down or halting of the production line so that an alternative can be decided.

In other instances, the supervisor may determine, for example, based on their knowledge and experience with the machines in the work center, that the highest ranked machine is actually not suitable for the specified operation and/or the specified part. The ranking of machines allows the supervisor to make a quick decision on choosing the next most suitable machine for the task, and thus maintain the flow of work along the production line. On the other hand, a decision tree that only identifies a single class (machine) that turned out to be unsuitable for the task can result in a slow down or halting of the production line so that an alternative machine can be selected.

In some extreme instances, the machines identified in the rankings may all be deemed un-suitable for the particular task at hand. In that case, the supervisor can select a machine in the work center that was not in the rankings. We can see that in most situations, the ranking of machines reduces the chance of slow downs or work stoppages in the production line.

At block 712, the work center controller can deploy the selected machine to perform the specified operation on the specified part.

At block 714, the work center controller can collect data for the operation results (e.g., 122, FIG. 1), for example, time to complete the operation, amount of wastage of material, the resources consumed during the operation, etc. Operation results can include taking measurements on and otherwise assessing the processed part, for example, to assess the performance and accuracy of the machine. The operation results can be incorporated in the training data set.

Figure 8:
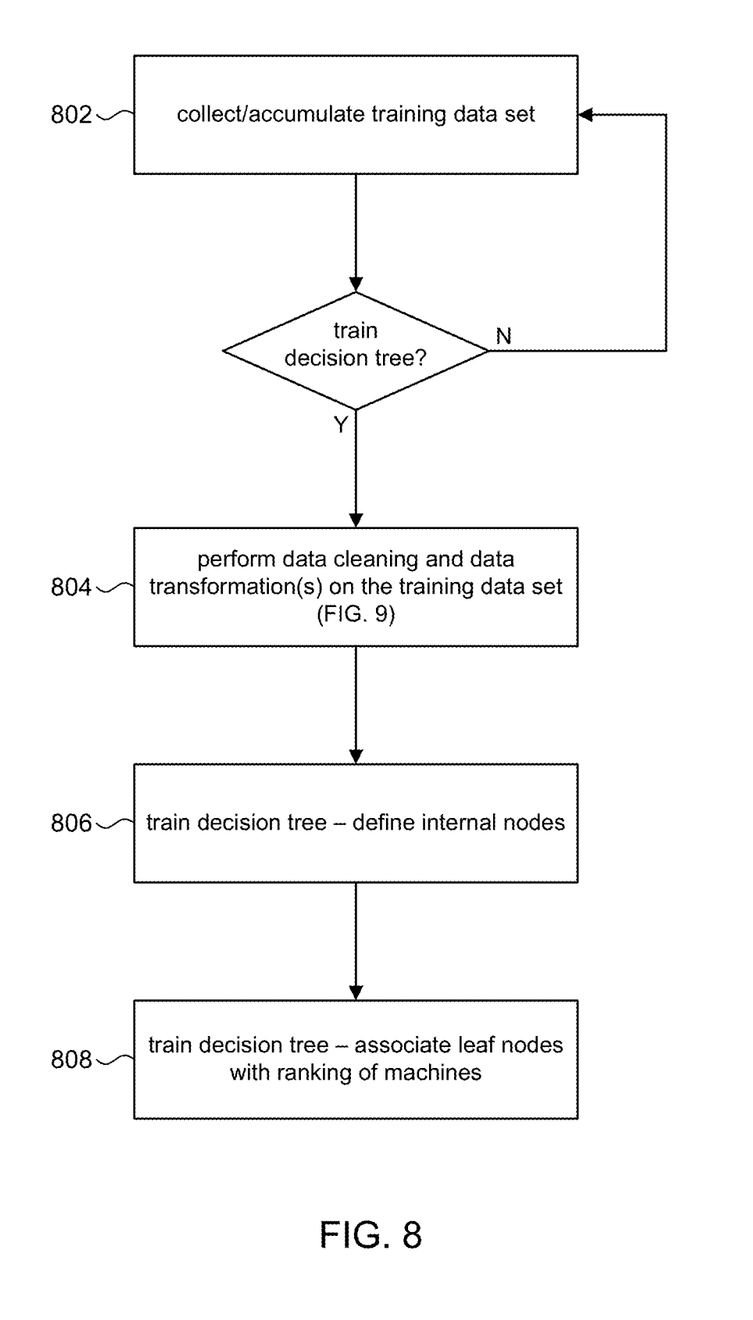
FIG. 8 shows a high level flow for training the decision tree used in FIG. 7 in accordance with the present disclosure.

Referring to FIG. 8, the discussion will now turn to a high level description of processing in the work center controller 106 to train a decision tree 202 in accordance with the present disclosure in order to facilitate the manufacturing process, such as illustrated in FIG. 7 for example. In some embodiments, for example, the work center controller can include computer executable program code, which when executed by a processing unit (e.g., 412, FIG. 4) comprising the work center controller, can cause the work center controller to perform processing in accordance with FIG. 8. The operation and processing blocks described below are not necessarily executed in the order shown, and can be allocated for execution among one ore more concurrently executing processes and/or threads.

At block 802, the work center controller can collect or otherwise accumulate data for the training data set (e.g., FIG. 3). In some embodiments, for example, a training sample (e.g., 206) can be created each time a part is submitted to the work center for processing. The work center controller can store attributes of the part and attributes of the operation as a data record (training sample) in the training data set, along with the machine that performed the operation. In some embodiments, results from processing the part in accordance with the operation (operation results) can also be recorded in the training sample. In some embodiments, for example, operation results can be obtained by manual and/or automated inspection/measurements of the processed part. Operation results can be obtained from data collected during processing of the part. Operation results can include data about the operation itself (e.g., time to perform the operation, resources consumed during the operation, etc.) and other information not directly relating the part itself.

Data collection can continue until a determination is made to train the decision tree, for example, to perform an initial training of the decision tree or to perform a subsequent re-training of the decision tree. The decision to train the decision tree can be based on the number of training samples collected. For example, an initial training session can be triggered after a few hundred training samples have been collected. A subsequent re-training can be triggered after some period of time has passed and/or after some predetermined number of training samples have been collected since the last training session. Re-training may be triggered when the work center has been reconfigured in some way; e.g., machines added, replaced, repaired, maintenance performed, and so on.

At block 804, the work center controller can "clean" the data in the training data set to ensure the data are in a suitable format for the training algorithm to train/create the decision tree. In accordance with the present disclosure, data clean can include adding and deleting data, in addition to data formatting, to improve performance of the decision tree. This aspect of the present disclosure is discussed further below.

At block 806, the work center controller can invoke, activate, or otherwise apply a training algorithm to train the decision tree using the training data set, by defining a configuration of internal nodes that comprise the decision tree. In accordance with the present disclosure, the decision tree defines a set of categories of machine rankings (e.g., 510) rather than individual machines and categorizes an input into one of the machine rankings (e.g., 116). Although the details for defining the internal nodes are beyond the scope of, and are otherwise not relevant to, the present disclosure, the basic approach of the training algorithm is to analyze the attributes in the training data set to determine the relative placement of attributes among the internal nodes of the decision tree. At each node (starting from the root node), an attribute (or attributes) in the training data set are identified as a basis for classifying the training samples in that node as belonging to different machines (classes). A splitting criterion is determined to decide how to split the node into two or more children nodes, thus categorizing the training data set into two or more classes of the machine attribute. Statistical quantities such as entropy, information gain, gain ratio and the like can be computed for the attributes to decide the relative placement of attributes on the decision tree; i.e., which attributes get to be the root node, which goes for internal node and so on. The process continues with each child node until the leaf nodes are reached.

At block 808, the work center controller can associate each resulting leaf node with a ranking of the machines in the training data set. In accordance with the present disclosure, leaf nodes can be associated with at least a subset of the machines for a particular operation on a particular part. The subset of machines can be ranked according to their suitability to perform a particular operation on a particular part. In some embodiments, for example, the rankings can be based on probabilities. For example, the following computation can be made to compute a probability for each class attribute:

$$\Sigma P_i \times \log_2 P_i$$

where $P_i$ is the probability that a given input (e.g., training sample or query) that specifies a particular operation on a particular part belongs to a class $C_i$, where in accordance with the present disclosure, $C_i$ refers to a machine in the work center.

The equation can be explained as follows:
Let N be the number of records (training samples) in the training data set S and assume that the class attribute (i.e., machine) has m distinct values (i.e., m different machines). Let $C_i$ refer to machine i. Let $N_i$ be the number of samples in the training data set that belongs to class $C_i$.

The expected information needed to classify such samples can be represented by equation:

$$I(S_1, S_2, \ldots, S_m) = -\Sigma P_i \times \log_2 P_i$$

Here $P_i$ is the probability that a given sample belongs to class $C_i$ and this probability can be estimated by $N_i/N$.

Thus, using this formula, we can obtain a probability $P_i$ (for i=1–m) for each sample $S_j$ (for j=1–N) that it belongs to class $C_1, C_2, C_3 \ldots C_m$.

Thus, for each sample $S_i$, the decision tree model can come up with a distribution of probabilities $P_1, P_2, \ldots P_m$, (corresponding machines $M_1, M_2, \ldots M_m$) for sample $S_i$, where $P_1$ is the likelihood that the sample $S_i$ can be performed on machine $M_1$, $P_2$ is the likelihood that the sample $S_i$ can be performed on machine $M_2$, and so on. Since low probabilities may not be very meaningful, in some embodiments a threshold can be applied so that a probability less than a predetermined threshold value can be set to 0%. Samples in the training data set that have similar distributions of probabilities will traverse the same path of intermediate nodes in the decision tree to the same leaf node. In some embodiments, this distribution of probabilities can be used as the ranking 116 of machines at the leaf node.

When a query (e.g., 204) is submitted to the decision tree, for example by a supervisor during manufacturing, the query's traversal path will be the same as the samples that the query is similar to, and so the query will arrive at the same leaf node in the decision tree. The distribution of probabilities (e.g., rankings 116) at that leaf node can be used to select a machine for the particular operation on a particular part that is specified in the query.

Figure 9:
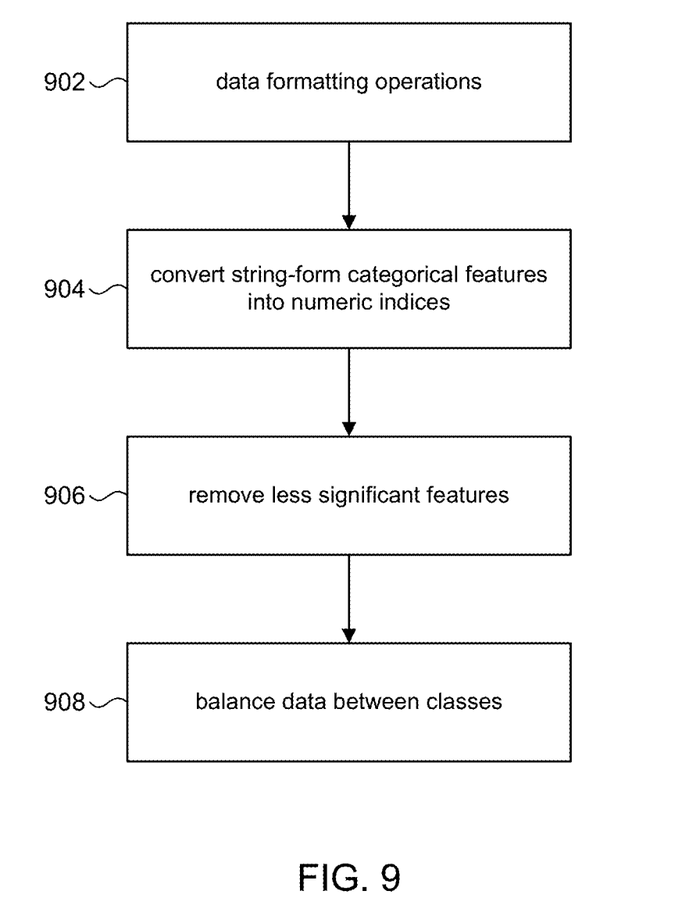
FIG. 9 shows a high level flow for data cleaning in accordance with some embodiments of the present disclosure.

Referring to FIG. 9, the discussion will now turn to a high level description of data cleaning (block 804, FIG. 8) in accordance with the present disclosure.

At block 902, data comprising the training data set can be scanned and reformatted to a format that is more suitable for processing by the training algorithm used to train the decision tree. For example, time related data (e.g., dates, clock time) may be converted to specific formats; for example, a time value may be reformatted in the form HH:M M:SS, a date may be reformatted in the form YYYY:MM:DD, and so on.

At block 904, string-form categorical features may be mapped into numeric indices, as numbers are more suitable than character strings for processing in the decision tree.

At block 906, less significant features can be removed from the training data set. In some embodiments, for example, a backward feature elimination technique can be employed to remove features that may not be deemed very significant for model prediction.

At block 908, classes in the training data set can be balanced. In accordance with the present disclosure, each "class" in the training data set refers to a machine. The training data set can be disproportionate in the sense that there are far more training samples for some machines than for other machines. In some embodiments, a synthetic over-sampling technique can be used on classes that have disproportionately fewer samples than other classes to create artificial samples in those classes to balance out the number of samples of each class in the training data set. For example, an attribute in an under-sampled class (machine) can be averaged across all the training samples for that class. A randomly generated value (e.g., within x standard deviations from the average) can be added to the average value thus creating a new instance of the attribute value. The process can be repeated for every attribute in the under-sampled class. A new training sample for that class can be synthesized from the newly created attributes instances and inserted into the training data set. This can result in a richer data set having a more balanced sampling for each class, while still ensuring the basic properties of the training data set remain the same.

CONCLUSION

A supervisor can spend a lot of time manually deciding which operation should be performed using which resource/machine in a work center. This is a time-consuming process that is repetitive and can lead to errors. Embodiments in accordance with the present disclosure can improve manufacturing times by ranking machines according to their suitability for performing a give operation on a given part to facilitate the supervisor's decision making process.

Improvements in the manufacturing line can be realized because the ranking of machines is based on the performance history of all the machines. Manual allocation is bound to be imprecise because a human user cannot retain long histories of machine performance, which can quickly become intractable when there are a lot of machines, operations, and different parts to consider. By comparison, embodiments in accordance with the present disclosure can readily scale to any number of machines, operations, and parts to be processed.

Embodiments in accordance with the present disclosure are based on extensive data analysis and insights obtained from the actual plant data. The ranking of machines is bound to be very accurate and sturdy for all types of situations and scenarios.

The self-learning abilities of the model help the model to learn from previously unseen data thereby improving its performance as the time passes. Thus there would be no need for any human intervention or parameter tuning for a long time resulting into a robust and sturdy solution.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a production line, the method comprising:
training a decision tree using a machine learning algorithm and training data based on part attributes, operation attributes, and operation results for operations on parts by a plurality of first machines in the production line, the decision tree comprising a plurality of leaf nodes, each leaf node associated with a ranking of the plurality of first machines;
receiving attributes of a part to be processed in the production line;
receiving attributes of an operation to be performed on the part;
selecting a machine from among the plurality of first machines in the production line that can perform the operation on the part, including:
executing the decision tree using the attributes of the part and the attributes of the operation to determine a leaf node associated with a ranking of machines selected from the plurality of first machines, the ranking of machines representing machines determined by the decision tree to be suitable for the operation to be performed on the part, wherein the machines in the ranking of machines are ranked based on the attributes of the part and the attributes of the operation and indicate their suitability to perform the operation on the part;
outputting the ranking of machines to a decision maker; and
receiving input from the decision maker indicative of a machine selected based on the ranking of machines; and
deploying the selected machine to perform the operation on the part.

2. The method of claim 1, wherein the ranking of machines is a subset of the plurality of first machines.

3. The method of claim 1, wherein the selected machine is a top- ranked machine in the ranking of machines.

4. The method of claim 1, wherein the decision maker is an operator in the production line who selects a machine based on the set of machines.

5. The method of claim 4, wherein a top-ranked machine in the ranking of machines is unavailable, and the operator uses the ranking of the ranking of machines to identify and select a second to the top-ranked machine in the ranking of machines as an alternate machine to perform the operation on the part.

6. The method of claim 4, wherein the operator determines a machine in the plurality of machines that is not in the ranking of machines to be more suitable than those in the ranking of machines and selects that machine to perform the operation on the part.

7. A non-transitory computer-readable storage medium having stored thereon computer executable instructions, which when executed by a computer device, cause the computer device to:
train a decision tree using a machine learning algorithm and training data based on part attributes, operation attributes, and operation results for operations on parts by a plurality of first machines in the production line, the decision tree comprising a plurality of leaf nodes, each leaf node associated with a ranking of the plurality of first machines;
receive attributes of a part to be processed in the production line;
receive attributes of an operation to be performed on the part;
select a machine from among the plurality of first machines in the production line that can perform the operation on the part, including:
execute the decision tree using the attributes of the part and the attributes of the operation to determine a leaf node associated with a ranking of machines selected from the plurality of first machines, the ranking of machines representing machines determined by the decision tree to be suitable for the operation to be performed on the part, wherein the machines in the ranking of machines are ranked based on the attributes of the part and the attributes of the operation and indicate their suitability to perform the operation on the part;
output the ranking of machines to a decision maker; and receive input from the decision maker indicative of a machine selected based on the ranking of machines; and deploy the selected machine to perform the operation on the part.

8. The non-transitory computer-readable storage medium of claim 7, wherein the ranking of machines is a subset of the plurality of first machines.

9. The non-transitory computer-readable storage medium of claim 7, wherein the selected machine is a top-ranked machine in the ranking of machines.

10. The non-transitory computer-readable storage medium of claim 7, wherein the decision maker is an operator in the production line who selects a machine based on the set of machines.

11. The non-transitory computer-readable storage medium of claim 10, wherein a top-ranked machine in the ranking of machines is unavailable, and the operator uses the ranking of the ranking of machines to identify and select a second to the top-ranked machine in the ranking of machines as an alternate machine to perform the operation on the part.

12. The non-transitory computer-readable storage medium of claim 10, wherein the operator determines a machine in the plurality of machines that is not in the ranking of machines to be more suitable than those in the ranking of machines and selects that machine to perform the operation on the part.

13. An apparatus comprising:

one or more computer processors; and a computer-readable storage medium comprising instructions for controlling the one or more computer processors to be operable to:

train a decision tree using a machine learning algorithm and training data based on part attributes, operation attributes, and operation results for operations on parts by a plurality of first machines in the production line, the decision tree comprising a plurality of leaf nodes, each leaf node associated with a ranking of the plurality of first machines;

receive attributes of a part to be processed in the production line;

receive attributes of an operation to be performed on the part;

select a machine from among the plurality of first machines in the production line that can perform the operation on the part, including:

execute the decision tree using the attributes of the part and the attributes of the operation to determine a leaf node associated with a ranking of machines selected from the plurality of first machines, the ranking of machines representing machines determined by the decision tree to be suitable for the operation to be performed on the part, wherein the machines in the ranking of machines are ranked based on the attributes of the part and the attributes of the operation and indicate their suitability to perform the operation on the part;

output the ranking of machines to a decision maker; and receive input from the decision maker indicative of a machine selected based on the ranking of machines; and deploy the selected machine to perform the operation on the part.

14. The apparatus of claim 13, wherein the ranking of machines is a subset of the plurality of first machines.

15. The apparatus of claim 13, wherein the selected machine is a top-ranked machine in the ranking of machines.

16. The apparatus of claim 13, wherein the decision maker is an operator in the production line who selects a machine based on the set of machines.

17. The apparatus of claim 16, wherein a top-ranked machine in the ranking of machines is unavailable, and the operator uses the ranking of the ranking of machines to identify and select a second to the top-ranked machine in the ranking of machines as an alternate machine to perform the operation on the part.

18. The apparatus of claim 16, wherein the operator determines a machine in the plurality of machines that is not in the ranking of machines to be more suitable than those in the ranking of machines and selects that machine to perform the operation on the part.

19. The method of claim 1, wherein the executing of the decision tree includes traversal down the decision tree until the leaf node is reached.

20. The method of claim 1, further comprising:

balancing the training data among the plurality of first machines in the production line by generating artificial samples using synthetic over-sampling.

* * * * *